Oct. 9, 1945.   G. BARSKY   2,386,534
SAFETY GLASS COMPOSITION
Filed Jan. 28, 1942
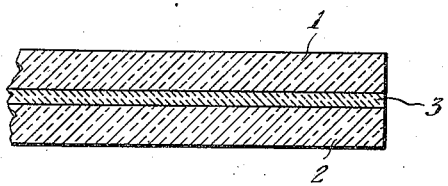
INVENTOR.
George Barsky
BY
H. C. Bierman
ATTORNEY Patented Oct. 9, 1945

2,386,534

UNITED STATES PATENT OFFICE 2,386,534

SAFETY GLASS COMPOSITION

George Barsky, New York, N. Y., assignor to Wecoline Products, Inc., Boonton, N. J., a corporation of New Jersey Application January 28, 1942, Serial No. 428,503

6 Claims. (Cl. 260—36)

The present invention is directed to plastic compositions particularly adapted for use in the production of safety glass which consists essentially of two sheets of glass held together by an intermediate film of a plastic material. More particularly, the present invention relates to improvements in the plastic material used in making the safety glass.

Various thermoplastic compounds have heretofore been used as the intermediate layer of safety glass and it has been found necessary to add to such substances suitable plasticizing materials which impart to the composition certain essential properties. A considerable number of plasticizers in synthetic and other plastic compositions have been known, but very few of these are applicable for the present purpose. For instance, there has been proposed the use of the higher fatty acid esters of certain glycols as plasticizers for nitrocellulose. Such products are of some value in nitrocellulose compositions, but only to a limited extent. Since the amount of this plasticizer which can be used in the composition is quite small, it does not exert a sufficient plasticizing effect. If a moderate amount thereof is added, then the composition has a frosty appearance due to the separating-out of the plasticizer. This would render a composition of this character incapable of use in safety glass.

Another composition previously used consisted in the ethylene glycol esters of low molecular weight fatty acids such as those having 8 or 10 carbon atoms. Plasticizers of this type have been successfully used in compositions for making safety glass since they are capable of blending in wide proportions with the synthetic materials, they are non-volatile, are water resistant, and do not separate from the compositions.

It is among the objects of the present invention to provide a composition of the general type of that set forth above, but one in which added advantages are inherent.

It is also among the objects of the present invention to provide a composition wherein the compatibility of the plasticizer with the synthetic material has been improved and wherein the adhesion of the composition to the glass is substantially increased.

It is still further among the objects of the present invention to provide a plasticizing material which is simple to produce, which is low in cost, and wherein the raw materials for the production thereof are readily available.

In practicing the present invention I provide an ester which is the tri-ethylene glycol ester of fatty acids having from 6 to 18 carbon atoms. An ester of this type is subjected to treatment with a halogen, usually chlorine, under such conditions as to add a substantial amount of chlorine to the molecule. Where the fatty acid in the ester is unsaturated, the chlorination takes place to at least the point where the iodine number has become practically negligible, and a higher degree of chlorination may be obtained. In other words, the chlorination is conducted at least until the double bonds have been saturated. Where a saturated acid is employed, the chlorination is conducted until there has been a substantial displacement of hydrogen by chlorine.

The following is an example of the operation of the present invention:

In a suitable reaction vessel there is placed a desired amount of tri-ethylene glycol oleate having a saponification number of 173, an iodine number of 70.6 and a density at 24° C. of 0.924. The reaction vessel is subjected to cooling by immersing the same in circulating cold water. Chlorine is bubbled slowly through the ester with constant stirring, the circulation of water being conducted so as to maintain a temperature in the reaction vessel between 20° and 25° C.

As the reaction proceeds the color of the ester becomes darker and after a sufficient time it becomes lighter again, indicating the approximate end of the operation. Chlorine is allowed to bubble through the mass for about an additional 10 minutes. Thereafter, carbon dioxide is bubbled through the chlorinated ester to remove free chlorine, and the flow of carbon dioxide is continued until a test of the product with starch-iodide paper gives a negative indication for chlorine. The resulting product has a density of 1.14 at 30° C. and has an iodine number of 0.3.

A plastic composition is made with the above-described chlorinated ester by providing a solution of a vinyl resin in a mixture of ethyl alcohol and ethyl lactate, the proportions thereof being 9 parts of alcohol and one part of lactate. Sufficient of the vinyl resin is added to make approximately a 10% solution. The vinyl resin is preferably a polymerized incomplete vinyl acetal, wherein a condensation was caused to take place between about 2 to 8 mols of polyvinyl alcohol and 1 mol of straight chain saturated aliphate aldehyde, such as butraldehyde. The chlorinated ester is introduced into the solution in the proportion of three parts of ester to seven parts of resin. The solution is poured on a smooth sheet of metal such as amalgamated tin, and the solvent is allowed to evaporate. The film is stripped from the sheet metal, is placed between two sheets of glass and pressed into position. While continuing the pressure, it is subjected for one hour in an oven to a temperature of 85° C., and the assembly then cooled to room temperature while maintaining pressure thereon.

The resultant safety glass has been found to be perfectly clear and highly adherent. It was maintained at a temperature of over 40° C. without causing any sweating or separation of the chlorinated ester from the composition. It was also subjected to a temperature below —10° C. for a substantial length of time, without causing any cloudiness, crystallization or deterioration of the composition. Under all of the tests, the material remained clear and transparent. Upon being subjected to a shattering test, the safety glass proved to be highly effective.

In the accompanying drawing constituting a part hereof, the single figure is a fragmentary, cross-sectional view of a piece of safety glass made in accordance with the present invention.

There is provided two sheets 1 and 2 of glass, and between the same is a plastic layer 3, which is transparent and which acts as a permanent bond for the sheets of glass. Layer 3 consists essentially of a resinous material of the thermoplastic type, having incorporated therein a plasticizer taken from the class consisting of the tri-ethylene glycol esters of higher fatty acids, preferably those having from 6 to 18 carbon atoms. The esters are halogenated to a substantial degree, the halogen being attached to the acid radical of the ester and not to the glycol radical. A composition which has been found suitable is a mixture of a vinyl resin with the tri-ethylene glycol ester of oleic acid, the latter radical having been chlorinated at least to the point of saturation of the double bond.

Although the invention has been described with a single specific example, it will be apparent that various modifications and changes may be made in the details thereof. For instance, various plastic substances may be used such as, cellulose nitrate, ethyl cellulose, poly-methyl acrylate, poly-ethyl acrylate, poly-methyl methacrylate, poly-ethyl methacrylate, poly-vinyl acetate, poly-vinyl chloracetate and the vinyl acetal resins. The products of the present invention have been found to be compatibile with such resinous materials, and the chlorinated esters may be incorporated therein in widely varying proportions.

Other fatty acids may be substituted for the oleic, such as, capric, lauric, myristic, linoleic and various others having from 6 to 18 carbon atoms. Also, the halogenation may be conducted with fluorine instead of chlorine, but the latter is preferable since it is more readily obtainable and easier to operate with. Also, hydrogenated fatty acids, such as ricinoleic or mixtures containing the same, may be used to give the halogenated esters. The presence of a hydroxy group in the ester improves the properties thereof for the desired purpose. Other glycols may be used, such as the ethylene and propylene glycols, and mixtures containing not only the triethylene and the like glycols, but higher and lower alkylated compounds may be used. Mixtures of two or more fatty acids of the above-named group may be used to give the mixed halogenated esters.

Instead of pouring the composition as stated above, other methods of forming the film may be adopted, as the hot rolling of the mass. The amount of plasticizer used in the composition may be varied within wide limits, it being possible to incorporate as much as 50% thereof with good results. As little as 10% of the plasticizer will give a measurable and desirable effect.

The essence of the present invention is the halogenation of the compounds used. When certain unhalogenated esters are used, the safety glass is unsatisfactory as shown by tests; by halogenating the same, such esters are rendered suitable for the purpose. Certain other unhalogenated esters are satisfactory, but after halogenation they become still more suitable in that the desirable characteristics thereof have been improved. It, therefore, appears that the halogen imparts to the esters a marked adherence to the glass and a compatibility which render the esters highly satisfactory for the purpose.

What is claimed is:

1. A plastic composition adapted for use in safety glass comprising a resinous synthetic thermoplastic material taken from the class consisting of vinyl resins having incorporated therein a plasticizer taken from the class consisting of the tri-ethylene glycol esters of fatty acids having from 6 to 18 carbon atoms, said esters being halogenated to a substantial degree, the halogen being attached to the acid radical of said ester.

2. A plastic composition adapted for use in safety glass comprising a resinous synthetic thermoplastic material which is the condensation product of polyvinyl alcohol and butraldehyde having incorporated therein a plasticizer taken from the class consisting of the tri-ethylene glycol esters of fatty acids having from 6 to 18 carbon atoms, said esters being halogenated to a substantial degree, the halogen being attached to the acid radical of said ester.

3. A plastic composition adapted for use in safety glass comprising a synthetic thermoplastic material which is the condensation product of polyvinyl alcohol and butraldehyde, having incorporated therein the tri-ethylene glycol ester of oleic acid which is chlorinated to at least the saturation of the double bond of said acid.

4. In resinous synthetic plastic materials, plasticizers which are the triethylene glycol esters of fatty acids having from 6 to 18 carbon atoms, said esters being halogenated to a substantial degree, the halogen being attached to the acid radical of said ester.

5. In resinous synthetic plastic materials, plasticizers which are the glycol esters of fatty acids having from 6 to 18 carbon atoms, said esters being halogenated to a substantial degree, the halogen being attached to the acid radical of said ester.

6. In resinous synthetic plastic materials, plasticizers which are the triethylene glycol esters of unsaturated fatty acids having from 6 to 18 carbon atoms, said esters being halogenated to a substantial degree, the halogen being attached to the acid radical of said ester.

GEORGE BARSKY.